(12) United States Patent
Hernoult

(10) Patent No.: US 7,777,172 B2
(45) Date of Patent: Aug. 17, 2010

(54) METHODS FOR REDUCING CROSS TALK IN OPTICAL SENSORS

(75) Inventor: Thierry Hernoult, San Jose, CA (US)

(73) Assignee: Fairchild Semiconductor Corporation DE (US)

( * ) Notice: Subject to any disclaimer, the term of this patent is extended or adjusted under 35 U.S.C. 154(b) by 96 days.

(21) Appl. No.: 12/123,350

(22) Filed: May 19, 2008

(65) Prior Publication Data

US 2008/0296478 A1 Dec. 4, 2008

Related U.S. Application Data

(60) Provisional application No. 60/941,455, filed on Jun. 1, 2007.

(51) Int. Cl.
*G02B 27/00* (2006.01)
*H01J 3/14* (2006.01)

(52) U.S. Cl. .................... 250/216; 250/239; 359/614

(58) Field of Classification Search ........... 250/216, 250/239, 221; 359/614
See application file for complete search history.

(56) References Cited

U.S. PATENT DOCUMENTS

| 5,557,116 | A | * | 9/1996 | Masui et al. ............. 257/100 |
| 5,716,759 | A | | 2/1998 | Badehi |
| 6,911,648 | B2 | * | 6/2005 | Wu et al. .................. 250/239 |
| 6,943,423 | B2 | | 9/2005 | Kim |
| 7,385,178 | B2 | * | 6/2008 | Chin et al. ............ 250/231.14 |
| 2005/0077623 | A1 | * | 4/2005 | Roberts et al. ............ 257/724 |

FOREIGN PATENT DOCUMENTS

WO    WO2006089540    8/2006

OTHER PUBLICATIONS

PCTUS2008065354, May 30, 2008, Thierry Hernoult.

* cited by examiner

*Primary Examiner*—Georgia Y Epps
*Assistant Examiner*—Tony Ko
(74) *Attorney, Agent, or Firm*—Kenneth E. Horton; Kirton & McConkie

(57) ABSTRACT

Optical sensors containing reduced amounts of cross talk, as well as methods for making and using such sensors are described. The sensors contain a light absorption coating that is placed on a portion of the external surface of the optical sensor near the detector. This absorption coating reduces the amount of cross talk by reducing the amount of light reflected inside a transparent package of the sensor. As well, the coating can also reduce the amount of ambient and/or stray light that enters the sensor. The coating adds little cost or complexity to the manufacturing process for the sensors, yet reduces the cross talk without substantially increasing the size of the sensor or without increasing any reliability risks. Other embodiments are also described.

24 Claims, 3 Drawing Sheets

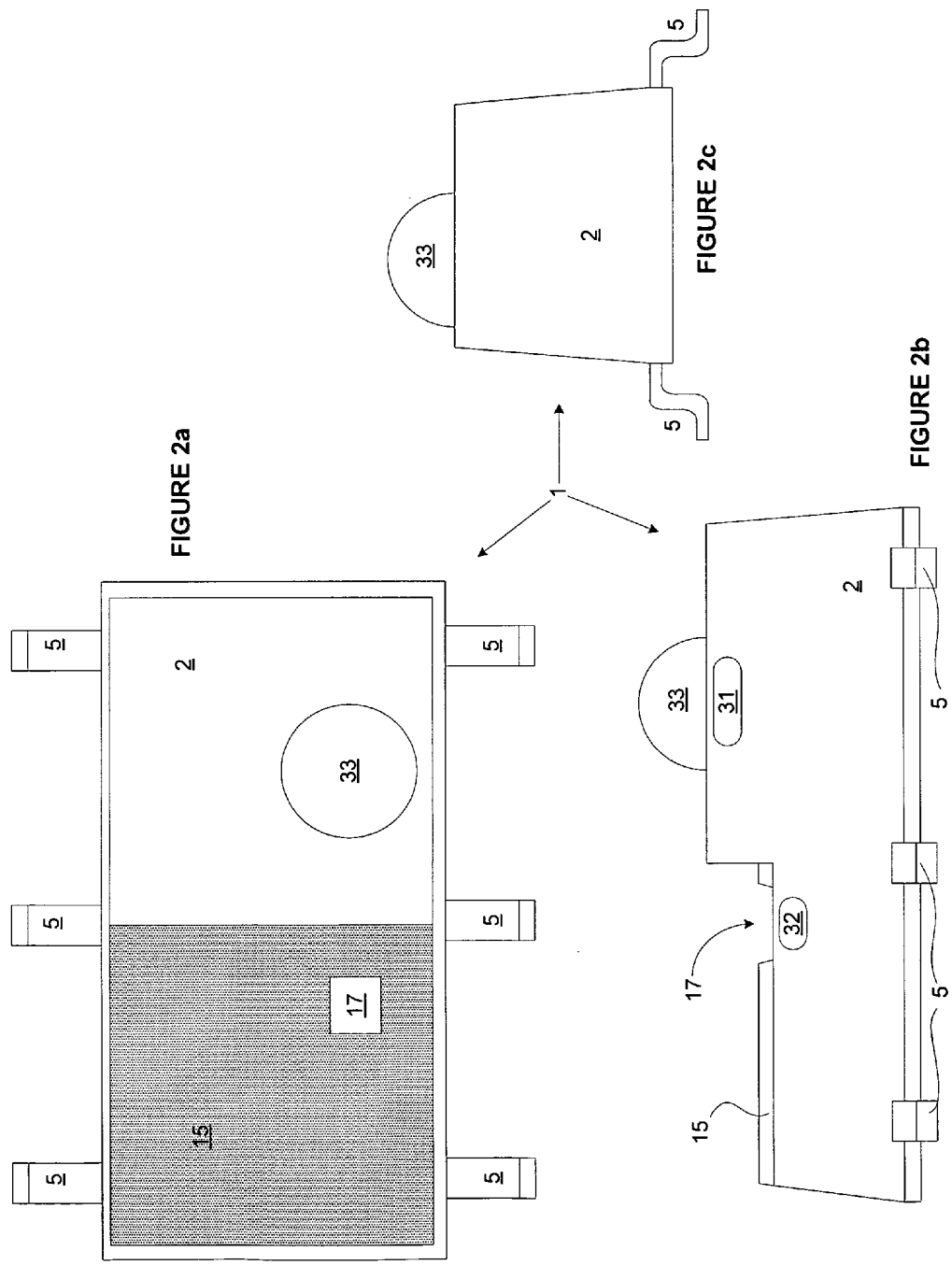

METHODS FOR REDUCING CROSS TALK IN OPTICAL SENSORS

CROSS-REFERENCE TO RELATED APPLICATIONS

This patent application claims priority of U.S. Application Ser. No. 60/941,455, filed Jun. 1, 2007, the entire disclosure of which is hereby incorporated by reference.

FIELD

This application generally relates to optical sensors and method for making and using such optical sensors. More specifically, this application relates to reflective optical sensors containing reduced amounts of cross talk.

BACKGROUND

Optical sensors are used in a wide variety of applications. One application where optical sensors are of particular use is to detect the presence and/or absence of an object. Two types of optical sensors that detect the presence and absence of an object are interrupt optical sensors and reflective optical sensors.

Interrupt optical sensors (also known as transmissive sensors) include an optical emitter and an optical detector located on opposite sides of an object to be sensed. The presence of the object is detected when the object breaks the optical path between the emitter and the receiver. The absence of the object is shown when the optical path between the emitter and of the receiver remains undisturbed (i.e., since the object does not break that optical path).

Reflective optical sensors, on the other hand, contain an optical emitter and an optical detector that are located on the same side of the object to be sensed. The object is detected when an optical emission from the optical emitter is reflected from a surface of that object and then received by the optical detector. Reflective optical sensors typically contain a light emitting diode ("LED") as the optical emitter and a photodiode or phototransistor as the optical detector. These two components are mounted in a side-by-side relationship in the housing of the optical sensor. The LEDs can have a broad angular emission window projected in a large undefined angular range (i.e., similar to a conventional light bulb).

The performance of optical reflective sensors can be measured, in part, by the contrast provided when scanning an object that contains alternating reflective and non-reflective surfaces. This contrast is typically determined by the reflectance of those surfaces, the resolution of the sensor compared to the dimensions of the object, and the amount of cross talk that contributes to the photocurrent between the optical emitter and the optical receive detector. This cross talk is the portion of emitted light that it internally reflected, scattered, or channeled to the optical detector (as opposed to that external light which is reflected by the object), as well as any direct illumination from the LED. Generally, the smaller the crosstalk, the better the operation of the optical reflective sensor.

There are currently two methods to minimize the problems associated with cross talk. As shown in FIG. 1, the first method places an opaque barrier 116 between the emitter (located in a first cavity 112) and the detector (located in a second cavity 114) in the sensor 100, and so is often called a packaging solution. This first method, while somewhat effective in preventing cross talk, requires a complex assembly process and does not allow for sophisticated optics.

The second method for minimizing cross talk processes the light signal in a differential manner by using a dual photodiode and a comparator. This method is therefore often called a die design solution. The die design solution is not very effective since the light is not evenly spread over the 2 photodiodes, does not work for analog output, and is expensive as it doubles the size of the photosensitive area.

SUMMARY

This application describes reflective optical sensors containing reduced amounts of cross talk, as well as methods for making and using such sensors. The sensors contain a light absorption coating that is placed on a portion of the external surface of the optical sensor near the detector. This absorption coating reduces the amount of cross talk by reducing the amount of light reflected inside a transparent package of the sensor. As well, the coating can also reduce the amount of ambient and/or stray light that enters the sensor. The coating adds little cost or complexity to the manufacturing process for the sensors, yet reduces the cross talk without substantially increasing the size of the sensor or without increasing any reliability risks.

BRIEF DESCRIPTION OF THE DRAWINGS

The following description can be better understood in light of Figures, in which:

FIGS. 2a through 2c show different views of some embodiments of a reflective optical sensor containing an absorption coating;

Figure 1:
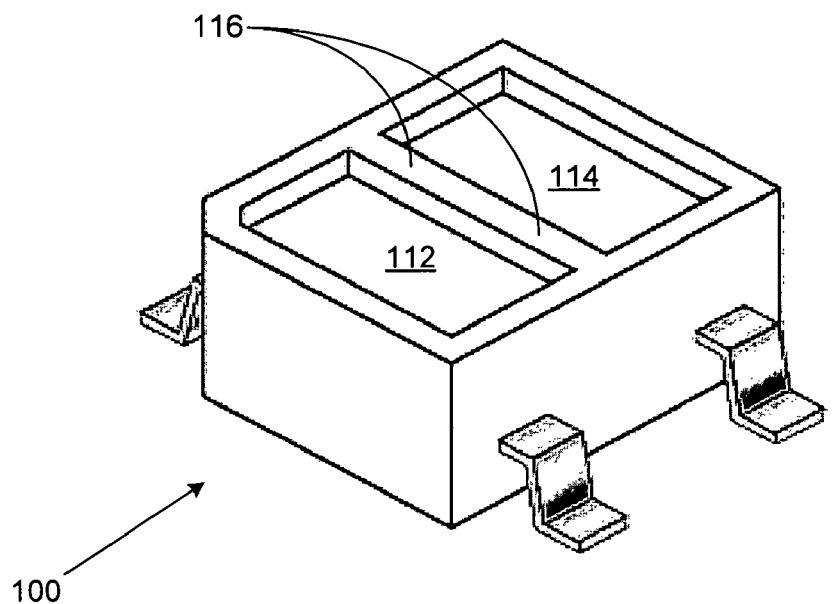
FIG. 1 depicts a conventional reflective optical sensor.

Together with the following description, the Figures demonstrate and explain the principles of the reflective optical sensors and methods for making and using such sensors. In the Figures, the configuration of components may be exaggerated or simplified for clarity. In the drawings, the thickness of layers and regions are exaggerated for clarity. It will also be understood that when a layer, component, or substrate is referred to as being "on" another layer, component, or substrate, it can be directly on the other layer, component, or substrate, or intervening layers may also be present. The same reference numerals in different drawings represent the same element, and thus their descriptions will not be repeated.

DETAILED DESCRIPTION

The following description supplies specific details in order to provide a thorough understanding. Nevertheless, the skilled artisan would understand that the optical sensors and methods for making and using such sensors can be implemented and used without employing these specific details. For example, while the description focuses on reflective optical sensors, it can be modified to be used in other optical sensors such as optical encoders and bar code readers heads. Indeed, the description can be used in numerous end uses, such as numerous printer, motion control, position control, and bar code applications.

The reflective optical sensors described in this application contain a coating that partially or completely absorbs the internally reflected light that can cause cross talk. As well, the coating can also reduce the amount of ambient and/or stray light that can enter the sensor. Some examples of such reflective optical sensors are depicted in the Figures and described herein.

Referring to the devices illustrated in FIGS. 2a through 2c, FIG. 2a contains a top view of the reflective optical sensor 1, FIG. 2b contains a side view of the sensor 1, and FIG. 2c contains an end view of the sensor 1. The optical sensor 1 comprises a light emitting element (or emitter) 31 and a light detecting element (or detector) 32. The light emitting element 31 has a broad emission window 33 that projects the light in a large angular range so that the maximum amount of light can be reflected off of the desired object which the sensor is measuring.

The light that can be emitted from the light emitting element 31 can be any known light that can be reflected off the desired object and then detected by light detecting element 32, whether that light exists in the visible spectrum or not. Examples of such light include infrared, monocolor visible, white, and combinations thereof. In some embodiments, the light used comprises red light. In some embodiments, the wavelength of the light can range anywhere from about 400 nm to about 1000 nm. In other embodiments, the wavelength of the light is about 630 nm.

The light emitting element 31 comprises any light source known in the art. Examples of known light sources include vertical cavity surface emitting lasers (VCSEL), resonant cavity light emitting diodes (RCLED), light emitting diodes (LEDs), and combinations thereof. In some embodiments, the light source comprises a light emitting diode. While any number of light sources can be combined to create the light emitting element, typically only a single light source is used as the light emitting element 31.

The light detecting element 32 comprises any known electronic component that can detect the light emitted form the emitter 31 and then reflected from the measured object. Examples of light detecting elements that can be used include a photodiode array, a charge coupled device (CCD), a phototransistor, a photodiode, a photodiode followed with a transimpedance amplifier, a transimpedance amplifier, or combinations thereof. In some embodiments, the light detecting element comprises a phototransistor. While any number of these components can be combined to create the light detecting element, typically only a single component is used as the light detecting element 32.

The light emitting and detecting elements are sealed in a packaging material (or package) 2. The package 2 encloses the light emitting element 31 and light detecting element 32, insulates them from the environment, and also protects them. In some embodiments, the package 2 is made of a partially or completely optically transparent material so that the light can pass partially or completely though it. The package can be made of any material consistent with these functions, such as silicone, glass, a transparent epoxy resin, or combinations of these materials. In some embodiments, the material used for the package comprises a transparent epoxy resin.

The light emitting element 31 and the light detecting element 32 are electrically connected to leads 5. The leads 5 extend out of the protective package 2 to connect the sensor 1 to an external electrical component or device, such as a printed circuit board which connects the optical sensor to a control circuit. Any lead known in the art can be used in the reflective optical sensor 1, including any conductive metal or metal alloy, such as steel or copper. In some embodiments, the leads 5 comprise steel. As depicted, the outer portions of the leads 5 are bent substantially in a shape of L to form horizontally extending end portions that can be easily mounted to a printed circuit board. Any other known configuration for the leads 5 can also be used. And while six leads are shown in the Figures, the optical sensor could contain any number of leads 5, including from 4 to 8.

As depicted in FIG. 2a, the sensor 1 contains a coating 15 that is located on the section of the sensor 1 containing the light detecting element 32. The coating 15 can be located over any desired part of this section of the sensor. In the embodiments illustrated in the Figures, the coverage area of the coating 15 in this section is maximized.

The coating 15 absorbs the light that is internally reflected in the sensor 1 that would otherwise eventually impinge on the light detecting element 32. This internally reflected light contributes the cross talk phenomenon in the sensor, as described above, and so when it reduces this light, it also reduces the cross talk. The coating 15 can also reduce the amount of ambient and/or stray light that enters the sensor. This ambient and/or stray light can also interfere with the operation of the optical sensor 1 since it can also be detected by the light detecting element 32.

The coating 15 can have any thickness that absorbs the internally reflected light and/or the ambient/stray external light. The actual thickness may also depend on the material(s) which is used to make the coating and the material used in the package 2. In some embodiments, the thickness of the coating 15 can range from about 20 μm to about 100 μm.

In some embodiments, the coating 15 contains a single layer. In other embodiments, though, the coating 15 can contain a plurality of layers, such as where one of the layers absorbs a certain type/wavelength of light. Another layer can then be used to absorb a different type/wavelength of light.

In some embodiments, the coating 15 does not completely cover the entire section of the sensor 1 containing the light detecting element 32. In these embodiments, the coating 15 contains an opening 17 at the location where the light reflected from the measured object will enter the sensor 1 and be detected. Thus, the useful light is allowed to enter through opening 17 and be detected by the light detecting element 32, while at the same time the coating 15 reduces the internally reflected light and the ambient/stray external light.

The size of the opening 17 will therefore depend, in part, on the size of the light detecting element 32. In some embodiments, such as where the detector is in the shape of a rectangle or square, the size of the opening can range from about 0.25 $mm^2$ to about 4 $mm^2$.

The opening 17 can have any shape that will maximize the amount of light reflected from the measured object while minimizing the internally reflected light and/or the ambient/stray external light. The shape used will also depend on the expected use of the sensor 1. Examples of the shapes that can be used include substantially rectangular, square, circular, oblong, triangular, elliptical, and trapezoidal shapes. In some configurations, the shape of opening 17 can be modified by providing the sidewalls of the opening 17 with an incline to allow more reflected light from the measured object to enter the sensor 1.

Figure 3:
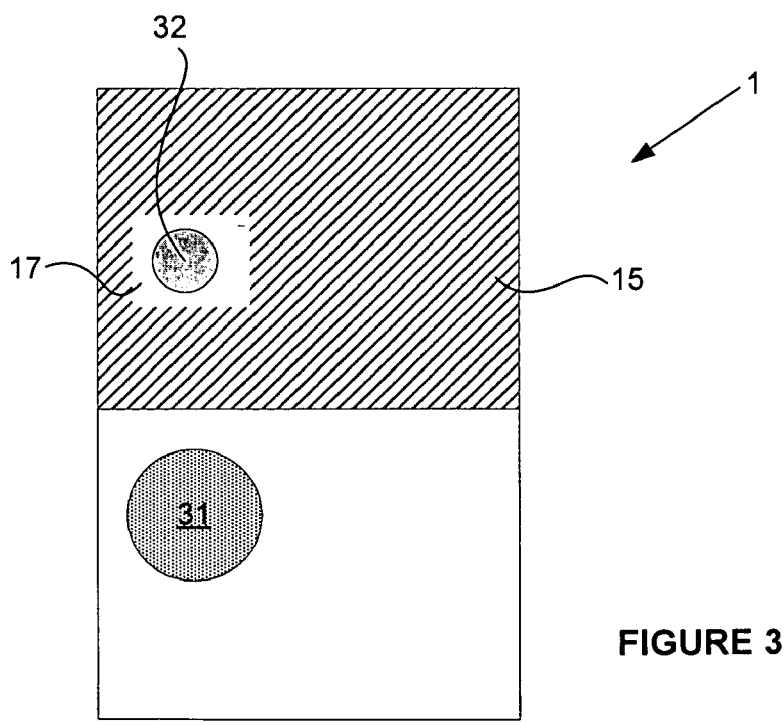
FIG. 3 shows other embodiments of a reflective optical sensor containing an absorption coating.

In some embodiments, the coating 15 and the opening 17 are configured as depicted in FIG. 3. In the sensor depicted in this Figure, the sensor 1 contains a coating 15 covering the section of the sensor 1 that contains the light detecting element 32 (which is depicted in this Figure as being substantially circular in shape). The section of the sensor 1 containing the light emitting element 31 does not contain a coating 15. The sensor 1 contains a substantially rectangular-shaped opening 17 in coating 15 that allows the light reflected from the measured object to pass though it and impinge on the detector.

Different configurations for the coating 15 can be used in the optical sensors. In some configurations, the coating 15 can be located under—rather than over—the outer surface of the sensor, even though such a configuration might complicate the manufacturing process. In other configurations, an air cavity can be included between the active area of the sensor 1 and the surface of the coating, whether the coating is on the inside or the outside of the outer surface. In yet other configurations, the coating 15 can be extended to cover the sides and bottom of the sensor. And still in other configurations, the coating 15 can even cover the entire surface of the sensor except for the emitter dome 33 and the opening 17.

The coating 15 can be made from any material, or combination of materials, that absorbs the internally reflected light and the ambient/stray external light. As well, the material(s) used in the coating should be resistant to water and any cleaning solvents that might be used with the sensor during manufacture or during operation, should be compatible with the material it is coated on (i.e., wettability and adherence), and should be compatible with the process used in dispensing the materials so that the formed thickness is uniform and consistent from lot to lot. Examples of the materials that can be used include inks, paints, and combinations thereof. In some embodiments, black ink can be used as the material for the coating 15. In other embodiments, inks that are used for semiconductor device marking can be used. In yet other embodiments, carbon-loaded inks that optimize the light absorbed can be used as the coating.

One measure of the effectiveness of the coating 15 is $I_{FT}$, the amount of LED current necessary to turn the detector on when no light is reflected from outside. The larger the $I_{FT}$ amount, the lower the cross talk of the sensor. In some instances, for the reflective optical sensors that do not contain a coating 15 and are configured as shown in FIG. 2a (but without a coating 15), the $I_{FT}$ can range from 2.3 mA to 7.9 mA. But by using a coating 15, the $I_{FT}$ can be increased anywhere from about 15.6 mA to about 25.9 mA. Thus, by using the coating 15, the cross talk can be reduced by about 50% to about 80% with less dispersion (i.e., a standard deviation of 7.3 mA).

The sensors described above can be made by any process which provides the structures described and illustrated. In some embodiments, the process described below is used to manufacture the sensors. First, a lead frame is prepared as known in the art. In some instances, the lead frame can be produced by pressing or stamping a thin metal plate into the desired shape. Next, the light emitting element 31 is bonded or attached to one portion of the lead frame and the light detecting element 32 is attached or bonded to another portion of the lead frame. The light emitting element 31 and the light detecting element 32 can be attached in the same process or in separate processes. While any attachment process known in the art can be used, a die attach process in a strip or matrix form can be used in some embodiments. Then, the material used in the die attach process is cured by any method known in the art.

Next, the light emitting element 31 and the light detecting element 32 are electrically connected to the lead frame. In some embodiments, this process is performed by using any known wire bonding process. Then the package 2 is formed around the light emitting element 31, the light detecting element 32, and most of the lead frame except for external leads 5. The package 2 can be formed by, for example, a transfer molding method in a strip form. The molded plastic material used in the transfer molding process provides the final shape of the package 2 with a dome shape above the emitter side of the sensor 1.

Next, the coating 15 is provided on the outside of the package 2 using any known process that leaves the opening 17 in the coating 15. In some instances, such as where an ink is used, the coating can be just applied selectively to the desired areas of the exterior surface of the package 2. In other instances, a layer of the coating material can applied over the entire detector section of the sensor and then the opening 17 can be formed by, for example, any known removal process for that coating material used.

Next, the molded plastic material of the package 2 is cured by any known process. Then, the sensors are singulated and tested, the leads extending from the lead frame are bent into the desired shape (such as shown in the Figures), and taping is performed as known in the art.

Figure 4:
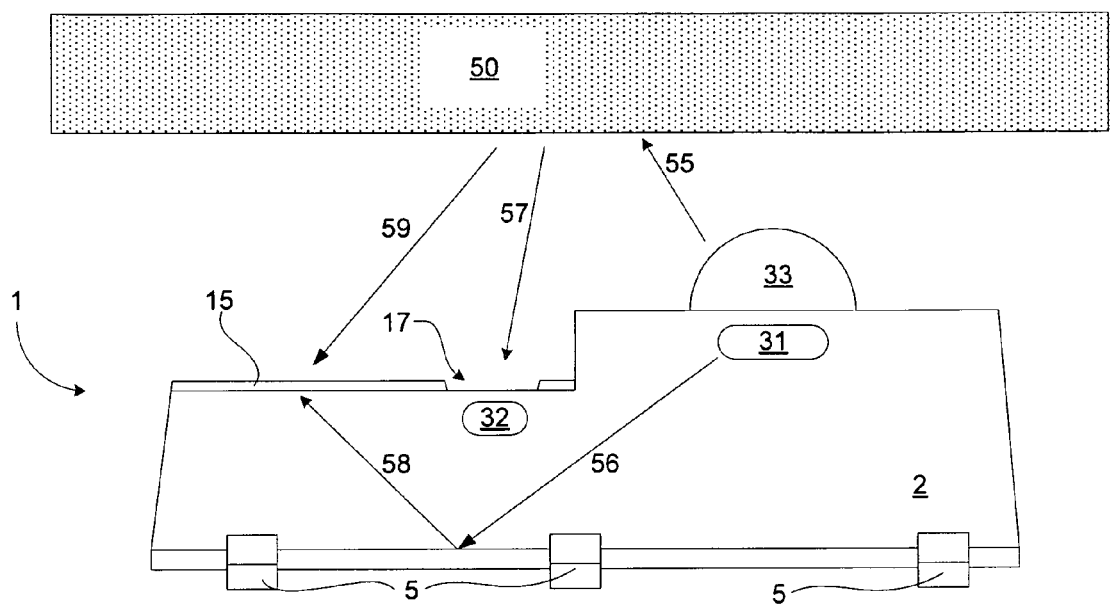
FIG. 4 depicts yet other embodiments of the operation of a reflective optical sensor containing an absorption coating.

The reflective optical sensor 1 can operate as illustrated in FIG. 4. Light 55 is emitted from the light emitting element 31, passes through the emission window 33, and impinges on the object 50 that is desired to be detected and/or measured. The reflected light from the object 50 then either impinges as light 59 on the coating 15 (and is absorbed) or passes through opening 17 in the coating 15 as light 57 and is detected by the light detecting element 32. As well, a certain amount of light 56 that is emitted from the emitting element 31 does not exit the package. A fraction of this light (now light 58) travels inside the package until it hits the inner side of the coating 15 where it is absorbed.

The ability to reduce the cross talk in the reflective optical sensors described above can also be applied in other optical sensors, including any other types of reflective sensors, whether they are non-surface mount, focused, or non-focused reflective optical sensors, as well as proximity sensors. As well, this ability could be incorporated into other optoelectronic devices where any internally reflected or scattered light needs to be reduced, such as bar code scanners, label scanners, light curtains, touchscreens, and transmitter/receiver modules, whether IrDA or not.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. An optoelectronic device, comprising:
   a light emitting element contained in a first portion of an optically transmissive packaging, the light emitting element attached to a lead that extends outside the packaging; and
   a light detecting element contained in a second portion of the packaging, the light detecting element attached to a lead that extends outside the packaging;
   wherein an external surface of the second portion of the packaging contains a light absorbing coating with an opening proximate the light detecting element.

2. The device of claim 1, wherein the coating absorbs internally reflected light inside the device to reduce cross talk resulting from that internally reflected light.

3. The device of claim 1, wherein the coating absorbs ambient or stray light from outside the device.

4. The device of claim 1, wherein the coating comprises inks, paints, or combinations thereof.

5. The device of claim 1, wherein the thickness of the coating ranges from about 20 μm to about 100 μm.

6. The device of claim 1, wherein the opening is located where reflected light passes through the packaging and impinges on the light detecting element.

7. An optical sensor, comprising:
a light emitting element contained in a first portion of an optically-transmissive packaging, the light emitting element attached to a lead frame with a lead that extends outside the packaging; and
a light detecting element contained in a second portion of the packaging, the light detecting element attached to a lead frame with a lead that extends outside the packaging;
wherein an external surface of the second portion of the packaging contains a light absorbing coating with an opening proximate the light detecting element.

8. The sensor of claim 7, wherein the coating absorbs internally reflected light inside the sensor to reduce cross talk resulting from that internally reflected light.

9. The sensor of claim 7, wherein the coating absorbs ambient or stray light from outside the sensor.

10. The sensor of claim 7, wherein the coating comprises inks, paints, or combinations thereof.

11. The sensor of claim 7, wherein the thickness of the coating ranges from about 20 μm to about 100 μm.

12. The sensor of claim 7, wherein the opening is located where reflected light passes through the packaging and impinges on the light detecting element.

13. The sensor of claim 7, wherein the light emitting element comprises a LED and the light detecting element comprises a photodiode.

14. The sensor of claim 7, wherein the opening has a substantially rectangular, square, circular, oblong, triangular, elliptical, or trapezoidal shape.

15. The sensor of claim 14, wherein the opening comprises sidewalls with an incline.

16. An reflective optical sensor, comprising:
a light emitting element contained in a first portion of an optically-transmissive packaging, the light emitting element connected to a lead frame with a lead that extends outside the packaging to a printed circuit board; and
a light detecting element contained in a second portion of the packaging, the light detecting element connected to a lead frame with a lead that extends outside the packaging to a printed circuit board;
wherein an external surface of the second portion of the packaging contains a light absorbing coating with an opening that is located where reflected light passes through the packaging and impinges on the light detecting element and the coating absorbs internally reflected light inside the sensor and absorbs ambient or stray light from outside the sensor.

17. The sensor of claim 16, wherein the coating comprises inks, paints, or combinations thereof.

18. The sensor of claim 16, wherein the thickness of the coating ranges from about 20 μm to about 100 μm.

19. The sensor of claim 16, wherein the opening has a substantially rectangular, square, circular, oblong, triangular, elliptical, or trapezoidal shape.

20. The sensor of claim 16, wherein the opening comprises sidewalls with an incline.

21. A method for optically sensing an object, comprising:
providing an optical reflective sensor containing a light emitting element contained in a first portion of an optically-transmissive packaging and a light detecting element contained in a second portion of the packaging, wherein an external surface of the second portion of the packaging contains a light absorbing coating with an opening that is located where reflected light passes through the packaging and impinges on the light detecting element;
providing a optically reflective object near the sensor;
emitting light from the light emitting element; and
detecting light reflected from the object through the opening in the coating.

22. The method of claim 21, wherein the coating comprises inks, paints, or combinations thereof.

23. The method of claim 21, wherein the thickness of the coating ranges from about 20 μm to about 100 μm.

24. The method of claim 21, wherein the opening has a substantially rectangular, square, circular, oblong, triangular, elliptical, or trapezoidal shape and comprises sidewalls with an incline.

* * * * *